United States Patent [19]
Brassette et al.

[11] 3,934,391
[45] Jan. 27, 1976

[54] HARVESTING TOPPER

[75] Inventors: Donald J. Brassette, Raceland; Richard A. Duncan, Thibodaux, both of La.

[73] Assignee: Thomson International Company, Thibodaux, La.

[22] Filed: July 25, 1974

[21] Appl. No.: 491,780

[52] U.S. Cl. ................................... 56/63
[51] Int. Cl.² ............................... A01D 45/02
[58] Field of Search .............. 56/63, 56–59, 56/192, 295, 6

[56] References Cited
UNITED STATES PATENTS

| | | |
|---|---|---|
| 3,391,522 | 7/1968 | Zweegers .................................. 56/6 |
| 3,443,369 | 5/1969 | Zweegers .................................. 56/6 |
| 3,596,447 | 8/1971 | Makeham et al. ...................... 56/63 |
| 3,772,864 | 11/1973 | Rodrigue ................................ 56/63 |

*Primary Examiner*—Russell R. Kinsey
*Attorney, Agent, or Firm*—Browning & Bushman

[57] ABSTRACT

A harvesting topper comprising an upstanding carrier having an axis and a side surface. The carrier is circular in cross-section transverse to said axis and has at least one deflector attached to its side surface. The deflector has side edges which are substantially circumferentially spaced from each other on the carrier. Means are provided for rotatably mounting the topper on a harvesting machine.

7 Claims, 4 Drawing Figures

HARVESTING TOPPER

BACKGROUND OF THE INVENTION

1. Field of the Invention

The present invention pertains to harvesting machinery particularly to toppers for use on harvesting machines, and especially for machines for harvesting crops such as sugar cane. Sugar cane grows in the form of tall stalks with long ribbon-like leaves. A concentration of the leaves is located on the upper parts of these stalks, known as the tops. The tops are not used in production of sugar cane juice and its products and must be removed before the remainders of the stalks are gathered for processing.

The machines used for harvesting sugar cane are usually vehicles which can move through the cane field cutting the cane as they go. They include means for drawing the stalks into a narrow portion of the machine where they are cut. A lower knife cuts the entire cane stalk off near the ground, and a topper cuts off the top. The topper includes some type of deflecting structure for flipping the cut tops to one side of the machine or the other. It is most desirable to have a deflecting structure which is reversible so that the cane tops can be deflected to either side desired.

2. Description of the Prior Art

One type of deflector used in prior art toppers was in the form of a paddle rotatably mounted above the knife of the topper. The paddle was disposed at an angle to a true radius of its axis so as to better project the cane to the desired side of the machine without catching the leaves. To reverse the direction of deflection, it was necessary to remove the paddle from the machine and turn it over so as to reverse the angle. This arrangement was inconvenient and time consuming.

Another type of topper employed a deflecting structure in the form of a regular polygonal box which could be rotated in either direction by reversible drive means. The flat walls of the box formed deflecting surfaces which would deflect the cane in the direction of rotation. Although easier to reverse than the other type of deflector, the box was difficult and indeed impossible to fabricate perfectly symmetrically. Even when constructed as symmetrically as possible, it often caused vibration problems as it was rotated about its axis.

Another known type of topper included a cylindrical core having a plurality of radially extending blades. This type has the disadvantage that the ribbon-like leaves of the cane tend to become caught on the blades and carried around and into the machinery, a phenomenon known as "backfeeding". This type of topper as well as the box type described above are disclosed in prior U.S. Pat. No. 3,772,864.

SUMMARY OF THE INVENTION

The topper of the present invention has a deflecting structure which comprises an upstanding cylindrical carrier with one or more deflectors attached to its side surface. The carrier has an axis and is circular in cross section transverse to the axis. The topper also includes means for mounting said topper for rotation about the axis of said cylindrical carrier. Each of the deflectors has two side edges which are substantially circumferentially spaced from each other on the carrier. The deflectors are preferably symmetrically circumferentially spaced about the carrier, and each deflector is preferably symmetrical about a radius of the carrier.

Because of the circular cross section of the carrier, which makes up the bulk of the deflecting structure, it can easily be made perfectly symmetrical and balanced. This is particularly true of the preferred form in which the carrier is cylindrical. This virtually eliminates the vibration problems of the box-type topper particularly if the deflectors themselves are symmetrical about radii of the carrier and are symmetrically disposed about the carrier. The carrier with attached deflectors is also much easier to construct than the box topper.

At the same time, the fact that the side edges of the deflectors are substantially circumferentially spaced on the carrier gives each deflector a broad base at its attachment to the carrier. This substantially alleviates the backfeeding problems of the bladed topper.

However, like the bladed topper and the box topper, the topper of the present invention can be easily reversed by reversible drive means without the need for removing and turning or otherwise altering the deflecting structure itself. Thus, it can be said that the topper of the invention provides the advantages of these prior toppers without their disadvantages.

It is thus an object of the present invention to provide a topper comprising a carrier of circular cross section transverse to its axis with attached deflectors.

A further object of the invention is to provide a topper comprising a cylindrical carrier with attached deflectors.

Another object of the invention is to provide a topper having deflectors with side edges substantially circumferentially spaced on the carrier so that the deflectors have broad bases.

A further object of the invention is to provide an easily reversed topper which is free of vibration problems.

Still another object of the invention is to provide an easily reversed topper which is free of backfeeding problems.

Still other objects and advantages of the present invention will be made apparent by the detailed description of the preferred embodiment, the drawings and the claims.

DESCRIPTION OF THE PREFERRED EMBODIMENTS

Figure 1:
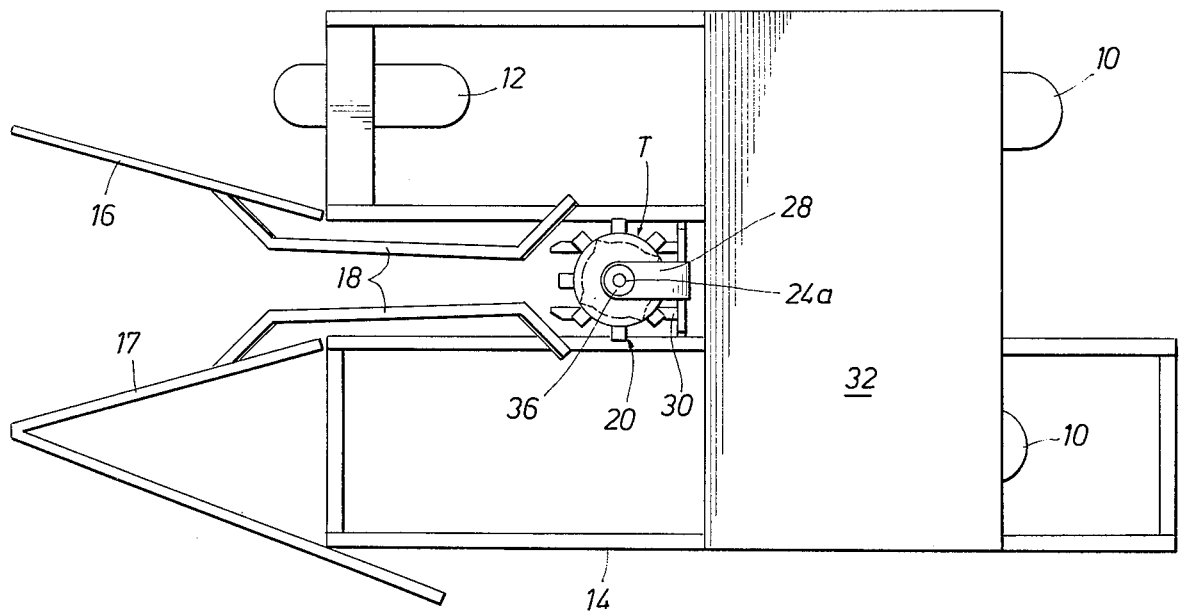
FIG. 1 is a diagrammatic plan view along lines 1—1 of FIG. 2 of a harvesting machine comprising a topper in accord with the invention.
Figure 2:
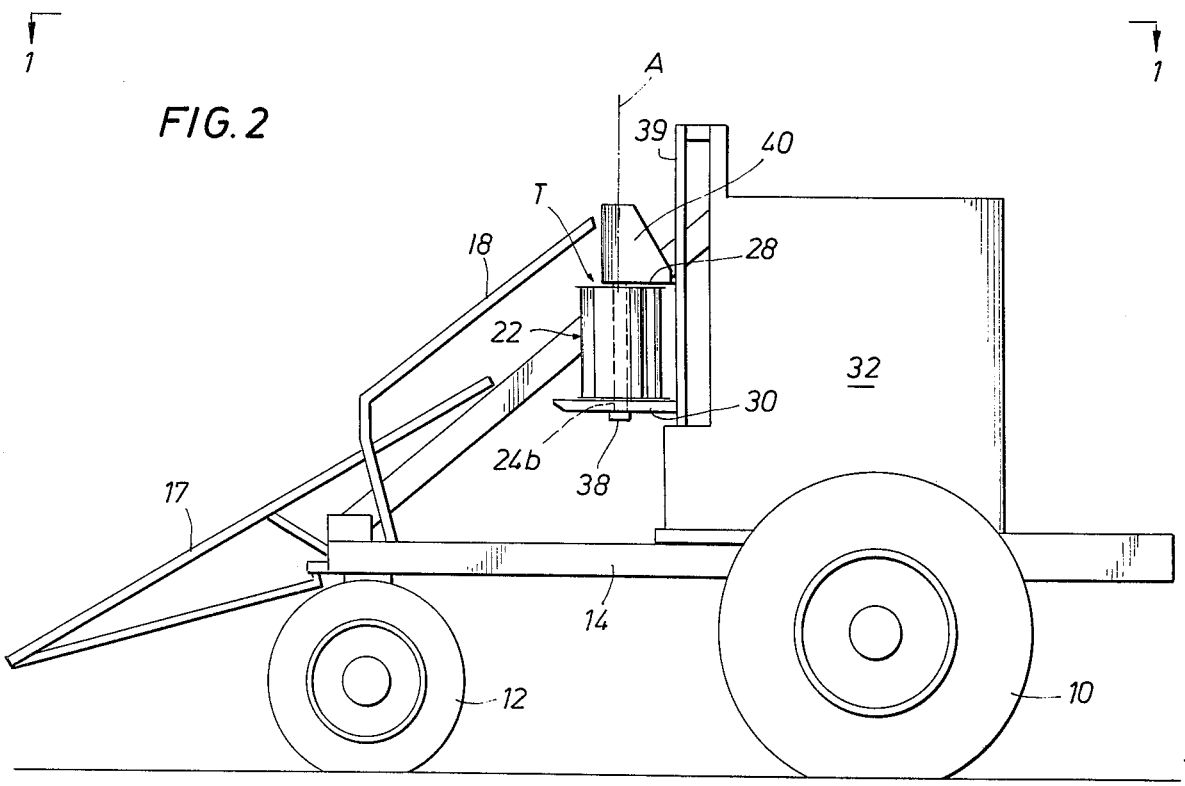
FIG. 2 is a diagrammatic side elevation of the harvesting machine of FIG. 1.

Reference to FIGS. 1 and 2 there is shown in somewhat diagrammatic form a harvesting machine having a topper in accord with the present invention mounted thereon. The machine is a vehicle having large rear wheel 10 and a smaller front wheel 12. The machine also includes a frame 14. The cane gathering structures, indicated diagrammatically at 16, 17, and 18 are mounted on the frame 14. In operation the machine moves along a row of cane so that the stalks are disposed between the outermost gathering structures 16 and 17. Structures 16 and 17 are sloped upwardly and also inwardly toward each other from their outer to their inner ends. Structures 18 extend generally from the inner ends of structures 16 and 17 to the topper T and slope further upwardly and inwardly. Thus, as the machine moves along the row, the stalks of cane in that row are drawn together and directed into the narrow portion of the machine between the inner ends of structures 18 at the center of the machine at which is located the topper T. Structures 16, 17, and 18 may comprise endless conveyors or the like with cane engaging elements for helping to draw the cane to the narrow portion of the machine.

The topper T which rotates about the axis A comprises a knife 20 for cutting off the tops of the cane which has been drawn in to the topper and a deflecting structure 22 for deflecting the cut tops to the side of the machine.

Figure 3:
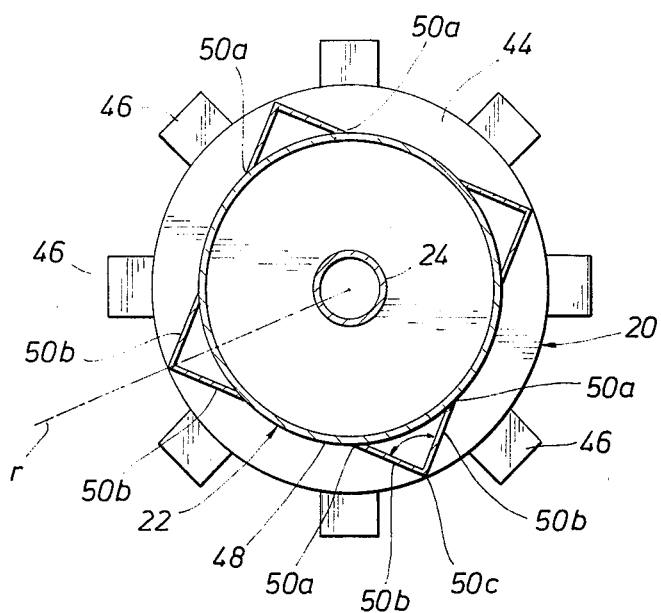
FIG. 3 is a transverse cross section on an enlarged scale of the topper of FIGS. 1 and 2 taken along lines 3—3 of FIG. 4.

Respective upper and lower ends 24a and 24b of a shaft 24 project from the ends of the topper and serve as means for mounting the topper for rotation about the axis A. The topper is mounted for rotation between an upper bracket 28 and a lower support 30 extending horizontally outwardly from the body 32 of the machine, the body 32 being mounted on the frame 14. Shaft end 24a is rotatably mounted in the bracket 28 and secured by a nut 36. Shaft end 24a extends upwardly beyond nut 36 where it is connected to the drive means, motor 34 (FIG. 3). Shaft end 24b is rotatably mounted in the lower support 30 and secured by a nut 38.

Reversible drive means are connected to the topper for selectively rotating it about axis A in either the clockwise or counterclockwise direction. As shown, the drive means is a hydraulic motor 34 mounted above the topper (see FIG. 4). The motor 34 has been broken away in FIG. 1 in order to show the bracket 28, shaft end 24a and nut 36. Shields, one of which is shown at 40, may be provided toprotect the motor 34. The topper T, bracket 28 and lower support 30 are also mounted for vertical adjustment on rails 39.

The remainder of the machine, e.g. engine, operator's controls, etc., is represented diagrammatically by the body 32.

Figure 4:
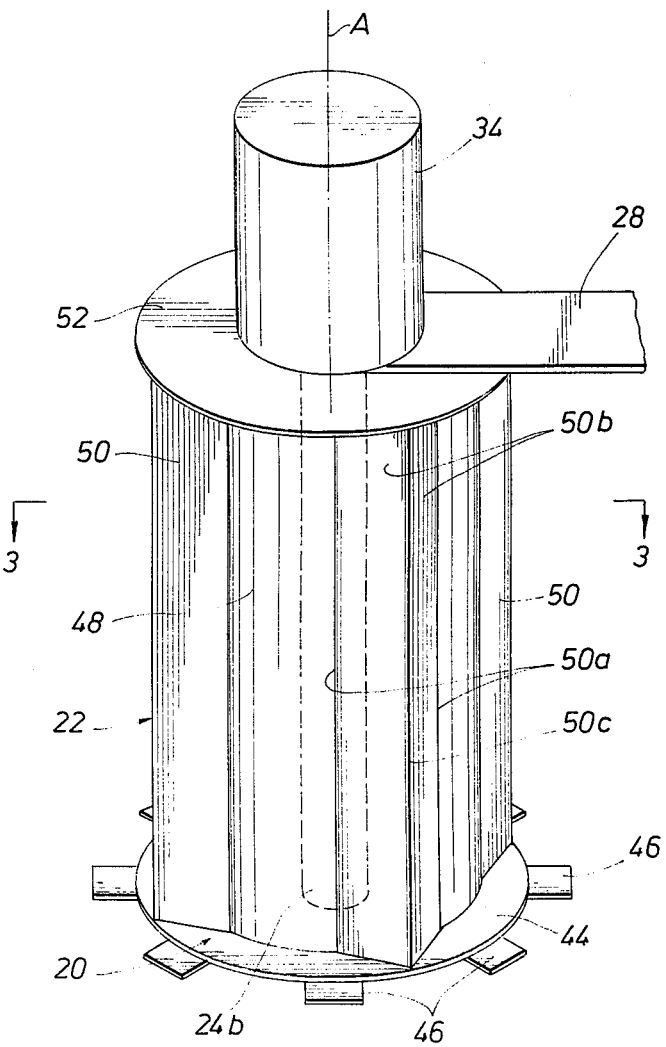
FIG. 4 is a perspective view on an enlarged scale of the topper and drive means.

Turning now to FIGS. 3 and 4 for a more detailed description of the topper, it will be noted that the axis A is substantially vertical. While it may not always be necessary to provide a truly vertical axis, the axis should always be upstanding in the sense that it has a substantial vertical component of direction. The deflecting structure 22 is also upstanding in this sense. The deflecting structure 22 comprises an upstanding carrier 48 having the axis A as its longitudinal axis. The carrier is circular in cross section transverse to the axis A and is preferably cylindrical as shown.

The deflecting structure also comprises a plurality of deflectors 50 attached to the side surface, i.e. the cylindrical outer surface which faces laterally outwardly with respect to the carrier axis, of the carrier 48 and projecting radially outwardly therefrom. In some cases it might be possible to construct the topper with only one deflector 50. However, the preferred embodiments include a plurality of deflectors 50 symmetrically circumferentially spaced about the carrier 48 for better balance.

Each of the deflectors 50 has a pair of side edges 50a by which the deflector 40 is attached to the carrier 48.

The side edges 50a of each deflector 50 are substantially circumferentially spaced from each other about the carrier 48 so that the deflectors 50 each have a broad base at their attachement to the carrier 48. In fact, the entire cross-sectional shape of the deflectors 50 is broad as compared with the thin cross section of a blade. As seen in FIG. 3, the base of each deflector 50, measured between its side edges 50a, is at least as long as, and in the preferred embodiment even longer than, the radial dimension of the deflector measured from the carrier 48 to the deflector apex edge 50c. It will also be appreciated that either of the side surfaces 50b of a deflector 50 can serve as a leading side depending on which direction the deflecting structure is being rotated. In either case, the leading side wall slant tangentially backward with respect to the direction of rotation from its side edge 50a to the apex edge 50c. Each of the side surface 50b of each deflector 50 extends outwardly from a respective one of the side edges 50a generally at an angle greater than 90°with respect to that portion of the cylindrical outer surface of carrier 48 which lies adjacent the respective side edge 50a (the portion external to, rather than underlying, the deflector). The tangential component of direction of the side surface 50b is instrumental in preventing the cane leaves from catching on the deflectors as they do on blade-type deflectors whose sides are radially directed without such tangential component. The broad base and generally broad cross-sectional shape of the deflectors 50 and the tangential components of the sides 50b virtually eliminate the backfeeding problems presented by the bladed deflecting structures of the prior art. At the same time, the carrier, being circular in cross section, eliminates the vibration problems of the prior box-type deflecting structures since it is possible to make the carrier perfectly symmetrical. It is particularly easy to do so if the carrier is cylindrical as shown.

In order to enhance the balance provided by the cylindrical carrier, and also to ensure that the deflecting action is the same whichever direction the topper is rotated, the deflectors 50, as viewed in cross section transverse to the carrier axis, are preferably each symmetrical about a radius of the carrier. One such radius $r$ is shown in FIG. 3 with one deflector 50 being symmetrical about $r$. The other deflectors 50 are similarly symmetrical about other radii not shown. In the embodiment shown, the deflectors 50 each include two flat side surfaces 50b each of which extends outwardly from one of the side edges 50a and which converge at an apex edge 50c. Other forms of symmetrical deflectors can, of course, be devised. As shown, the deflectors 50 are four in number and the angles formed by the sides 50b at their apexes 50c are 90°angles. However, it should be understood that the number of deflectors as well as the angles formed could be varied.

The deflecting structure 22 is closed at its upper end by a disc 52. The lower end of the deflecting structure is closed by the knife 20 which comprises a disc 44 with a plurality of radially extending blades 46 about its periphery. The knife 20 is rotated with the deflecting structure 22 by the motor 34.

From the above description it will be apparent that the present invention provides a harvesting topper which is easily reversed by conventional reversible drive means without the need for removal or adjustment of any part of the deflecting structure. At the same time, the topper of the present invention is free of the backfeeding and vibration problems of the prior easily reversed toppers. The topper of the invention is also easy to manufacture and to operate.

It will be appreciated that many modifications may be made in the harvesting topper of the invention without departing from the invention. It is, therefore, intended that the scope of the invention be limited only by the appended claims.

We claim:

1. Deflector apparatus for a harvesting topper, said deflector apparatus comprising:

an upstanding carrier having an upstanding axis and a surface facing laterally outwardly with respect to said axis, said surface being circular in cross section transverse to said axis, a deflector attached to said carrier and projecting laterally outwardly from said laterally outwardly facing surface, said deflector having two side edges circumferentially spaced from each other along said laterally outwardly facing surface of said carrier and two deflector side surfaces each extending outwardly from a respective one of said side edges generally at an angle greater than 90° with respect to the portion of said laterally outwardly facing surface of said carrier adjacent said respective side edge, said deflector side surfaces tending to converge laterally outwardly of said side edges, and means connected to said carrier for mounting said deflector apparatus for rotation about the axis of said carrier.

2. Deflector apparatus according to claim 1 wherein said carrier is cylindrical.

3. Deflector apparatus according to claim 1 wherein said deflector, in cross section transverse to said axis, is symmetrical about a radius of said carrier.

4. Deflector apparatus according to claim 1 further comprising a plurality of said deflectors symmetrically circumferentially spaced about said carrier.

5. Deflector apparatus according to claim 4 wherein said deflector side surfaces are flat and the deflector side surfaces of each of said deflectors intersect in an apex edge.

6. Deflector apparatus according to claim 5 wherein said deflector side surfaces of each of said deflectors form a substantially 90° angle at said apex edge.

7. Deflector apparatus according to claim 6 wherein said deflectors are four in number.

* * * * *

UNITED STATES PATENT AND TRADEMARK OFFICE
CERTIFICATE OF CORRECTION

PATENT NO. : 3,934,391
DATED : January 26, 1976
INVENTOR(S) : DONALD J. BRASSETTE & RICHARD A. DUNCAN It is certified that error appears in the above-identified patent and that said Letters Patent are hereby corrected as shown below:

COLUMN     LINE 4            15     Delete the word "wall" and insert the word --will--.

Signed and Sealed this

Sixth Day of July 1976

[SEAL]

Attest:

RUTH C. MASON
*Attesting Officer*

C. MARSHALL DANN
*Commissioner of Patents and Trademarks*